United States Patent
Yacoub et al.

(10) Patent No.: US 8,815,188 B2
(45) Date of Patent: Aug. 26, 2014

(54) METHOD AND DEVICE FOR MONITORING A REDUCING AGENT SOLUTION COMPOSITION IN THE EXHAUST GAS SYSTEM OF AN INTERNAL COMBUSTION ENGINE

(71) Applicant: Ford Global Technologies, LLC, Dearborn, MI (US)

(72) Inventors: Yasser Mohamed sayed Yacoub, Cologne (DE); Christian Winge Vigild, Aldenhoven (DE); Daniel Roettger, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/966,626

(22) Filed: Aug. 14, 2013

(65) Prior Publication Data
US 2014/0050642 A1 Feb. 20, 2014

(30) Foreign Application Priority Data
Aug. 15, 2012 (DE) .......................... 10 2012 214 528

(51) Int. Cl.
*B01D 53/92* (2006.01)
*B01D 53/94* (2006.01)

(52) U.S. Cl.
CPC ................... *B01D 53/9495* (2013.01)
USPC ............ 423/212; 423/213.2; 60/274; 60/276; 60/301

(58) Field of Classification Search
USPC .................. 423/212, 213.2; 60/274, 276, 301
See application file for complete search history.

(56) References Cited

U.S. PATENT DOCUMENTS

| | | | | |
|---|---|---|---|---|
| 5,116,579 A | * | 5/1992 | Kobayashi et al. | ........... 422/111 |
| 2010/0236532 A1 | | 9/2010 | Xiao et al. | |
| 2011/0094208 A1 | * | 4/2011 | Bauer et al. | ..................... 60/276 |

FOREIGN PATENT DOCUMENTS

| | | | | |
|---|---|---|---|---|
| DE | 102004043933 A1 | | 3/2006 | |
| FR | 2934011 A1 | | 1/2010 | |
| JP | 3-229911 A | * | 10/1991 | ....................... 60/280 |

OTHER PUBLICATIONS

"UniNOx-Sensor," VDO Continental Trading GmbH, Frankfurt, Germany, Aug. 2007, ISBN 13624691648042022201, 2 pages.

* cited by examiner

*Primary Examiner* — Timothy Vanoy
(74) *Attorney, Agent, or Firm* — Julia Voutyras; Alleman Hall McCoy Russell & Tuttle LLP

(57) ABSTRACT

A method for monitoring a reducing agent solution composition in an exhaust gas system of an internal combustion engine with metered injection of the reducing agent solution upstream of an SCR catalytic converter comprises metering injection of the reducing agent solution into the exhaust gas stream, determining a measured variable of a change in water content in the exhaust gas stream in response to the injected reducing agent solution, and determining at least one indicator value of a composition of the reducing agent solution at least based on the determined measured variable. In this way, deviations from the standard composition may be taken into account during metering or be displayed as an error.

20 Claims, 2 Drawing Sheets

METHOD AND DEVICE FOR MONITORING A REDUCING AGENT SOLUTION COMPOSITION IN THE EXHAUST GAS SYSTEM OF AN INTERNAL COMBUSTION ENGINE

CROSS-REFERENCE TO RELATED APPLICATIONS

The present application claims priority to German Patent Application No. 102012214528.1, filed on Aug. 15, 2012, the entire contents of which are hereby incorporated by reference for all purposes.

FIELD

The present disclosure relates to a method and a device for monitoring a reducing agent solution composition in the exhaust gas system of an internal combustion engine.

BACKGROUND AND SUMMARY

It is known for the purposes of exhaust gas purification, in particular in motor vehicle diesel engines, to use externally supplied reducing agents with which the nitrogen oxide content in the exhaust gases is reduced. The reducing agent is generally injected into the exhaust gas stream by an injection device. An "SCR" catalytic converter located downstream of the injection device then carries out the actual reaction. SCR is the name used to describe the technique of Selective Catalytic Reduction (SCR) of nitrogen oxides in exhaust/waste gases from combustion plants, refuse incinerators, gas turbines, industrial plants and motor vehicle combustion engines, in particular diesel engines. The chemical reaction on the SCR catalytic converter is selective, i.e. nitrogen oxides ($NO$, $NO_2$) are preferentially reduced, while unwanted secondary reactions (such as for example the oxidation of sulfur dioxide to sulfur trioxide) are very largely suppressed. SCR catalytic converters are often used in combination with soot particle filters and oxidation catalytic converters.

A reducing agent is required for the above-stated reduction reaction, ammonia ($NH_3$) typically being used for this purpose. The required ammonia is here not generally used directly, i.e. in pure form, but instead in the form of an aqueous urea solution, which is known industrially by the standard name AdBlue®. This substance will hereinafter be denoted "reducing agent solution."

The reason why the required ammonia is not carried in pure form is due to the hazardous nature of this substance. Ammonia has a corrosive action on the skin and mucous membranes (in particular also on the eyes), it additionally forms an explosive mixture in air and even in low concentrations has an unpleasantly pungent odor.

The composition of AdBlue® is governed by DIN 70070; the urea content in the aqueous solution specified in this standard is 32.5%±0.7%.

On injection into the hot exhaust gas stream, the above-stated urea solution undergoes a decomposition reaction forming ammonia and carbon dioxide. The ammonia produced in this manner is then available to the SCR catalytic converter which is arranged downstream. When ammonia reacts with the nitrogen oxides in the exhaust gas, a comproportionation reaction takes place, giving rise to water ($H_2O$) and nitrogen ($N_2$).

Selective catalytic reduction removes a large proportion of the nitrogen oxides from the exhaust gas. In contrast with the diesel particulate filter (DPF) or lean NOx traps (LNTs), this pollutant reduction does not entail any additional fuel consumption, as, unlike the above-stated catalytic converters, an SCR catalytic converter does not require a temporary deviation from ideal combustion conditions when in operation.

The quantity of urea to be injected depends on the nitrogen oxide emission from the engine and thus on the engine's instantaneous rotational speed and torque. Consumption of urea-water solution includes, depending on the engine's crude emission level, approximately 2 to 8% of the diesel fuel used.

Dispensing of the urea is here adjusted to the NOx in the exhaust gas mass flow by means of a "feed ratio". If too much urea is apportioned, the ammonia formed therefrom can no longer be consumed by reaction with NOx. This dispensing error may result in ammonia getting into the environment. Since ammonia can be perceived at even very low concentrations, this results in an odor nuisance. This phenomenon is avoided by using specific downstream catalytic converters which process the excess ammonia by reaction, but this entails additional structural expense.

Under-dispensing urea leads to unsatisfactory exhaust gas purification and is therefore likewise undesirable.

When dispensing the reducing agent solution into the exhaust gas stream according to the respectively calculated feed ratio, it may be assumed that the urea content of the reducing agent solution corresponds to the respective predetermined value (in particular 32.5% for AdBlue®).

It has, however, been found in practice that it cannot be assumed that this concentration is always and in every case exactly complied with. In particular in the case of excessively long or improper storage, the concentration of urea may fall due to decomposition of urea into ammonium hydroxide and carbon dioxide.

If the actual urea content deviates from the standard value, this results in incorrect dispensing of the reducing agent solution with the above-described negative consequences which especially in the case of over-dispensing have a particularly negative impact. However, under-dispensing should also be avoided, as in this case the SCR catalytic converter cannot operate properly.

Even the tolerance of ±0.7% with regard to urea content which is admissible according to DIN 70070 means that, in order to avoid any over-dispensing which has a particularly negative impact when metering the reducing agent solution, there is a tendency to assume the upper tolerance limit (unless any additional structural measures are provided for breaking down excess ammonia). Falling below these tolerances therefore tends to have a still greater effect.

The inventors herein have recognized the above issues and provide a method for monitoring a reducing agent solution composition in an exhaust gas system of an internal combustion engine with metered injection of the reducing agent solution upstream of an SCR catalytic converter. In one embodiment, the method comprises metering injection of the reducing agent solution into the exhaust gas stream, determining a measured variable of a change in water content in the exhaust gas stream in response to the injected reducing agent solution, and determining at least one indicator value of a composition of the reducing agent solution at least based on the determined measured variable.

In this way, the composition of the reducing agent solution (e.g., the urea concentration) may be determined based on a change in water content of the exhaust stream following injection of the reducing agent solution. The reducing agent solution may be assumed to have a given urea concentration that results in an expected change in water content following injection of the reducing agent solution. If the change in water content is different than expected, the assumed given urea concentration may be adjusted, and the amount of reducing agent solution metered to the exhaust gas stream may be adjusted to provide a constant, known concentration of urea in the exhaust gas stream, even if the composition of the reducing agent solution changes over time.

By doing so, a desired amount of reducing agent solution may be injected to the exhaust gas stream upstream of the SCR device. Thus, the production of excess ammonia, which may be harmful to the environment if released, may be avoided. Further, the production of too little ammonia, which may compromise conversion of NOx species in the SCR device, may also be avoided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
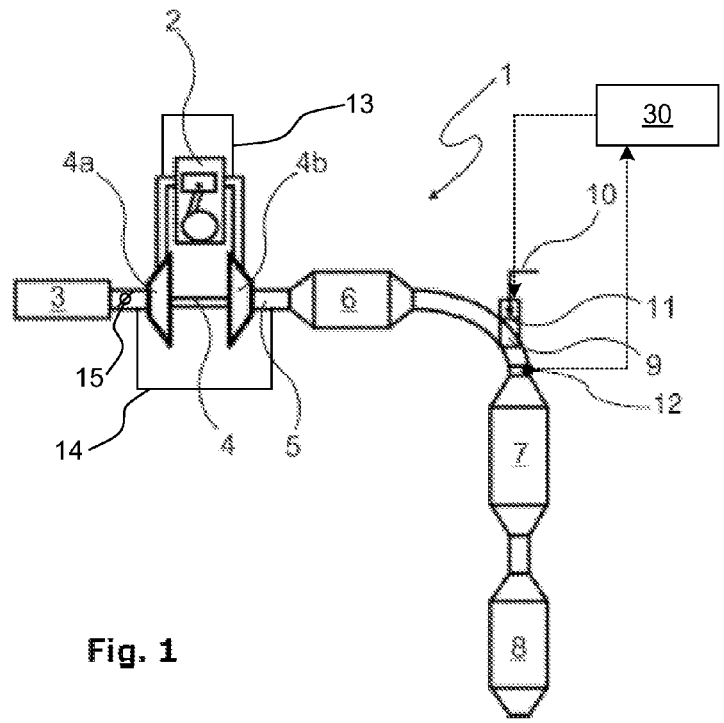
FIG. 1 is a schematic view of an internal combustion engine exhaust gas treatment arrangement in which the method according to the disclosure may be carried out.

Selective catalytic reduction (SCR) devices utilize a reducing agent, such as ammonia, to convert NOx present in exhaust gas to less harmful constituents, such as water and nitrogen. The ammonia may be created from urea injected into the exhaust at or upstream of the SCR device. The injected urea may be stored in a tank as a solution with water. While the urea concentration of the solution may be assumed to be a known concentration (based on information from a manufacturer of the reducing agent solution, for example), the actual urea concentration may vary from tank refill to tank refill. Furthermore, over time, the urea in the tank may break down into other products, evaporate, or otherwise dissipate, resulting in a lower proportion of urea and a higher proportion of water than initially provided. This urea solution may then be injected to provide a designated urea concentration in the exhaust. However, if more or less urea is actually present in the reducing solution than assumed, excess ammonia may be released to the atmosphere or conversion of NOx may be compromised.

To determine the urea concentration of the reducing solution, the water content of the exhaust following a reductant injection may be measured using an oxygen sensor. This water content may be compared to the water content of the exhaust prior to the injection event. The resulting change in water content resulting from the reductant injection may be used to determine the urea concentration of the reductant, and subsequent reductant injections may be adjusted to account for the change in urea concentration.

The change in water content may be measured during an engine operation where fuel injection is not occurring. Such conditions may occur during an engine overrun, where torque from the engine is not needed to propel the vehicle (such as when the vehicle is coasting down a hill). Thus, exhaust is still being expelled from the engine, but no combustion of fuel is occurring. Therefore, additional water vapor produced during combustion is not present to confound the determination of the change in water content due to the reductant injection.

Further, the accuracy of the water content measurement by the oxygen sensor may be increased when the oxygen concentration in the exhaust is relatively low and/or when the mass flow of the exhaust is relatively low. To reduce mass flow and/or oxygen concentration, an intake throttle may be closed or partially closed, restricting the flow of air through the engine to the exhaust, and/or exhaust gas recirculation (EGR), where exhaust is directed back to the engine intake, may be increased.

The change in water content is here preferably measured by a broadband oxygen sensor, which is arranged downstream of the point of injection and the output signal of which responds to the water content (i.e. generally the water vapor content) in the exhaust gas stream in that, as a function of the water vapor concentration, the oxygen measurement signal falls from the natural oxygen concentration of approximately 21%. Such broadband oxygen sensors are robust and tried and tested.

Even if, strictly speaking, no "exhaust gases" are being produced with the fuel supply shut off, the term "exhaust gas" is nevertheless used for the gases flowing in the exhaust gas system.

The term "injection" of the reducing agent solution may mean both simple atomization into the exhaust gas stream, it then being assumed that the reducing agent and the water contained therein are vaporized by the heat of the exhaust gas stream or of the following exhaust gas treatment elements. This vaporization may also be assisted by heating elements during injection.

The present disclosure exploits the circumstance that, according to the DIN standards, the reducing agent solution substantially consists of urea and high purity water; only small proportions of other constituents are present. Therefore, provided that the solution is injected into the exhaust gas stream at a predetermined concentration, it is possible to draw a conclusion as to the actual urea content on the basis of the signal from an oxygen sensor.

When measuring the change in water content of the exhaust gas, account is preferably taken of a prevailing baseline water content, also without injection of the reducing agent solution, which is the result of the natural prevailing atmospheric humidity. This may be determined in various ways, specifically i) on the basis of other vehicle measured values, for example on the basis of the measured values of a moisture sensor (e.g., humidity sensor) for a vehicle air conditioning system and an exhaust gas temperature sensor; the baseline water content or baseline moisture content may be approximately estimated from these values on the basis of the humidity of the external air and the exhaust gas temperature;

ii) on the basis of measured values from a (dedicated) moisture sensor preferably arranged upstream of the injection site for the reducing agent solution (this may for example be a further broadband oxygen sensor), or iii) by a measurement by means of the broadband oxygen sensor used for the measurement of the water content of the exhaust gas in the context of a separate measurement without injection of injection agent, but under substantially identical measurement conditions.

As a result of the measurement, at least one indicator value is calculated which preferably describes the urea content of the injection agent. This calculation from the output signal of the oxygen sensor may proceed on the basis of a function determined in a prior test series or on the basis of a table memory which indicates a relationship between the measured oxygen concentration and the actual urea concentration. The corresponding value may be arbitrarily scaled, provided that only corresponding comparison values are scaled in a corresponding manner.

Alternatively, a plurality of indicator values may also be calculated, such as for example a value which indicates when a value exceeds or falls below a predetermined tolerance window.

On the basis of the resultant approximate knowledge of the actual urea content (within the bounds of measuring accuracy of the present method), it is then possible in one possible configuration of the disclosure to adjust or correct the metering of the reducing agent during subsequent operation of the SCR catalytic converter by appropriately correcting the urea concentration in the reducing agent solution used as an input in the calculation of the feed ratio.

Alternatively or in addition, an operator of the vehicle may be provided with an error display if the value exceeds or falls below a specified upper and/or lower threshold value.

An embodiment of the disclosure furthermore provides that, in the case of metered injection of the reducing agent solution, either (i) the reducing agent solution is injected such that a substantially constant reducing agent solution concentration is established in the exhaust gas mass flow over a measurement period, or (ii) the reducing agent solution is injected at a predetermined mass flow rate, the measured value from the oxygen measurement then being corrected on the basis of the actual exhaust gas mass flow rate. This thus means that it may be possible reproducibly to establish or at least calculate the concentration of reducing agent solution in the exhaust gas, to which end the current exhaust gas mass flow rate may also be measured or estimated. This requirement also applies to reducing agent solution injection during ordinary operation of the SCR catalytic converter, such that the necessary means for reproducible dispensing of reducing agent solution ought to be present in any event.

In order to increase measuring accuracy, it may be advantageous to reduce the exhaust gas mass flow rate by constricting the inlet (e.g., throttle) and/or by exhaust gas recirculation. As a consequence, injection of reducing agent solution leads to a higher water content in the measurement region, such that measurement errors have less impact.

The measurement according to the disclosure is preferably carried out either upstream or downstream of the SCR catalytic converter.

The disclosure furthermore relates to a device for monitoring a reducing agent solution composition in the exhaust gas system of an internal combustion engine with metered injection of the reducing agent upstream of an SCR catalytic converter.

A broadband oxygen sensor is here preferably used for measuring the oxygen content. In order to reduce component and feed line costs, said sensor may be integrated into a single component with a nitrogen oxide sensor.

The method according to the disclosure is preferably carried out periodically at relatively long intervals of time, or whenever reducing agent solution has been replenished.

Operating states of the motor vehicle with relatively steady-state conditions with the fuel supply shut off, such as for example overrun phases, are preferably used for this purpose.

FIG. 1 shows a schematic structure of a diesel engine with connected exhaust gas purification system 1. The system comprises a reciprocating piston engine 2 in the form of a turbocharged diesel engine which, on its intake side includes an intake throttle 15 that controls an amount of fresh air drawn in to the engine via an air filter 3, which air is precompressed by a compressor 4a of a turbocharger 4. In a manner known per se, the compressor 4a of the turbocharger 4 is driven via a common shaft by the turbine 4b thereof on the exhaust gas side. It goes without saying that the disclosure does not depend on the presence of a turbocharger and may also be used for other engine configurations, in particular also for engines with exhaust gas recirculation.

The combustion gases from the reciprocating piston engine 2 are conducted away by an exhaust pipe 5 consisting of a plurality of pipe segments. In the exhaust pipe 5, downstream of the turbocharger 4, there is an oxidation catalytic converter 6, to the outlet end of which, in the downstream direction of the exhaust pipe 5, is connected an SCR catalytic converter 7, to the outlet of which is in turn connected a rear muffler 8. An injection device 9 for an aqueous urea solution (AdBlue®) as the reducing agent solution is mounted between the oxidation catalytic converter 6 and the SCR catalytic converter 7.

One or more exhaust gas recirculation (EGR) passages may be present to conduct at least a portion of the exhaust gases back to the engine intake. As shown, a high pressure EGR passage 13 is configured to route exhaust from upstream of the turbine to the intake downstream of the compressor. A low pressure EGR passage 14 is configured to route exhaust from downstream of the turbine to upstream of the compressor. In some embodiments, only high pressure EGR may be present, only low pressure EGR may be present, or no EGR may be present.

Aqueous urea solution supplied by a reducing agent supply line 10 is atomized by said injection device and vaporized on an electrically operated heating element 11 and thus introduced into the exhaust pipe 5 in gaseous form. Alternatively, the agent may merely be atomized without an additional heating element; vaporization is then achieved by the exhaust gas heat.

The nitrogen oxides arising on operation of the turbodiesel engine 2 are initially stored in the SCR catalytic converter 7 and converted in a comproportionation reaction into water vapor and nitrogen by the ammonia arising from the decomposition reaction of the urea on contact with the heating element 11 or the hot exhaust gases.

A broadband oxygen sensor 12, which is integrated into a single unit with a NOx sensor (not shown), is located at the inlet to the SCR catalytic converter.

Output from oxygen sensor 12 and NOx sensor may be sent to a controller 30. Controller 30 may include instructions executable to determine a water content of the exhaust based on the output from the oxygen sensor and/or adjust an injected amount of reducing solution based on the exhaust water content, as explained below. Controller 30 is shown in FIG. 1 as a conventional microcomputer including a microprocessor unit, input/output ports, read-only memory, random access memory, keep alive memory, and a conventional data bus. Controller 30 may receive various signals from sensors coupled to the engine including: engine coolant temperature (ECT) from a temperature sensor coupled to cooling sleeve; a measurement of engine manifold pressure (MAP) from a pressure sensor coupled to an intake manifold of the engine;

an engine position sensor from a Hall effect sensor sensing crankshaft position; a measurement of air mass entering the engine from a sensor (e.g., a hot wire air flow meter); and a measurement of throttle position from a throttle position sensor. In an aspect of the present description, an engine position sensor produces a predetermined number of equally spaced pulses every revolution of the crankshaft from which engine speed (RPM) can be determined.

In order to carry out the method according to the disclosure, a state is awaited in which relatively steady-state engine operating conditions with a shut-off fuel supply prevail (for example overrun mode) and it is waited until fuel combustion residues have substantially left the exhaust gas system. At this point, the baseline water content of the exhaust gas stream is firstly measured by the sensor 12 for a predetermined period of time. A defined volumetric flow of the reducing agent solution is then injected for a predetermined period of time. Said solution vaporizes and the water content influences the signal from the sensor 12, as is shown in greater detail in FIG. 2.

Figure 2:
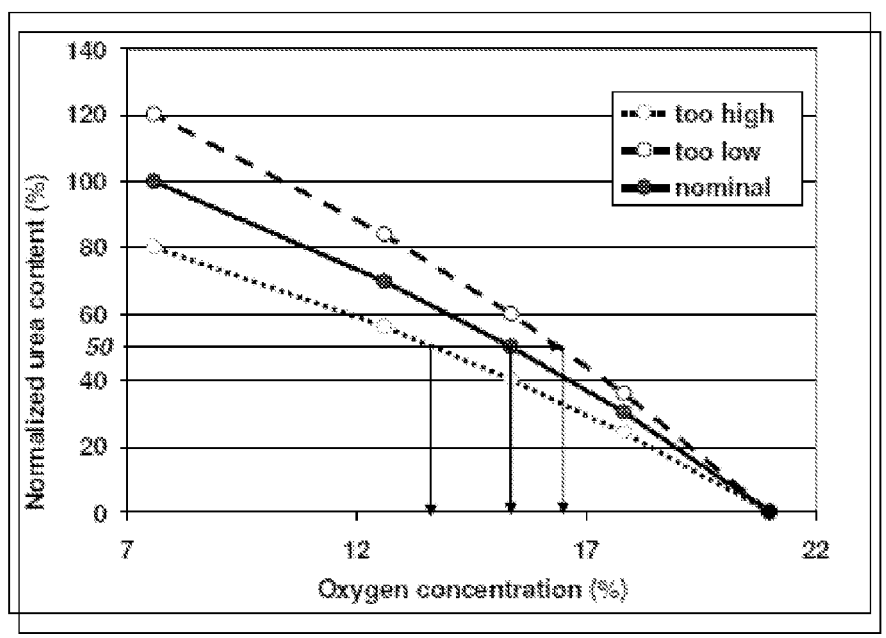
FIG. 2 is a diagram which shows the relationship between reducing agent injection and measured oxygen value.

According to FIG. 2, the urea solution concentration influences the output signal of the oxygen sensor 12. The graph shows the measured oxygen concentration relative to the urea solution content scaled to the urea content which would lead to saturation with urea in the gaseous phase, on the assumption that the urea concentration in the solution complies with the specification of 32.5%.

The three curves correspond to the nominal concentration (middle curve), a solution approximately 20% over-concentrated (lower curve) and a 20% under-concentrated solution (upper curve) at an exhaust gas temperature of approximately 90° C. and 0% humidity in the ambient air with the fuel supply shut off At 50% nominal urea concentration, the signal from the oxygen sensor varies, as is apparent, in the range of approximately 13% for the higher concentration and approximately 16% for the lower concentration. Without injection of reducing agent, the signal from the oxygen sensor rises to the natural oxygen content in the atmosphere of just about 21% (intersection with the x axis).

Given a specified urea solution content, conclusions may therefore be drawn from these measured values with regard to the actual urea content of the reducing agent solution.

A correction value derived from a function as shown in FIG. 2 may be used in order to correct reducing agent injection during subsequent ordinary operation of the SCR catalytic converter 7.

Thus, if the reducing agent solution is injected in an amount assumed to create a urea concentration of 50% in the exhaust gas (as determined based on a predicted urea concentration of the reducing agent solution and known mass flow rate of the exhaust gas), the oxygen concentration as determined by the oxygen sensor should be approximately 15%, according to the graph for the nominal concentration of urea, as the water present in the reducing agent solution will reduce the oxygen concentration of the exhaust gas. If the oxygen concentration is greater than 15%, the urea concentration of reducing agent is higher than the predicted urea concentration, while if the oxygen concentration is lower than 15%, the urea concentration of the reducing agent solution is lower than the predicted urea concentration. This is because when the urea concentration is higher, the proportion of water in the reducing agent solution is lower, and when the urea concentration is lower, the proportion of water in the reducing agent solution is higher. The amount of reducing agent solution injected to the exhaust gas may then be adjusted to account for the change in the urea concentration.

As shown by FIG. 2, the difference between the oxygen concentration of the exhaust gas when the urea concentration is higher than expected or lower than expected is greater when the oxygen concentration of the exhaust is lower (and correspondingly, when the normalized urea concentration of the exhaust is higher). Thus, to increase the accuracy of the measurement, the exhaust mass flow may be reduced by closing the intake throttle and/or increasing the amount of EGR directed to the intake.

Figure 3:
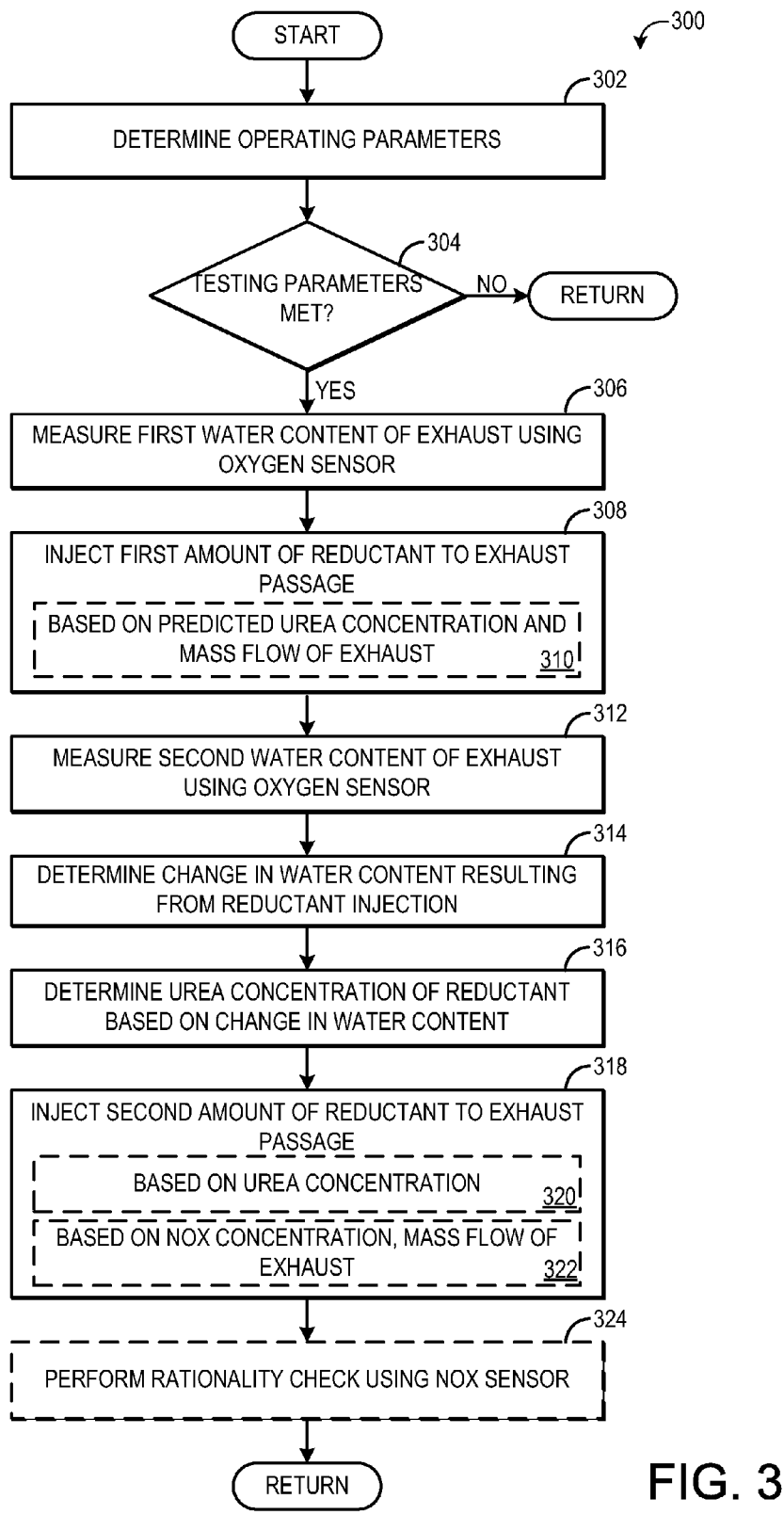
FIG. 3 is a flow chart illustrating a method for adjusting a reductant injection amount according to an embodiment of the present disclosure.

FIG. 3 is a flow chart illustrating a method 300 for adjusting an amount of reductant injected into an exhaust system upstream of an SCR device, for example upstream of SCR device 7 of FIG. 1. Method 300 may be carried out by controller 30 according to instructions stored thereon, based on output from oxygen sensor 12, in order to adjust an amount of reductant injected from injection device 9. At 302, method 300 includes determining operating parameters. The determined operating parameters include, but are not limited to, engine speed, engine load, fuel injection status, exhaust mass flow, EGR flow rate, ambient humidity, exhaust gas temperature, and other parameters.

At 304, it is determined based on the operating conditions if conditions for testing the concentration of urea in the reducing agent solution are met. The conditions may include engine operation without fuel injection. During engine operation without fuel injection, the engine is spinning, intake air is pumped through the cylinders to the exhaust system, but no combustion occurs due to the lack of fuel injection. Further, in some examples, the test conditions may include a throttle angle below a threshold (e.g., the throttle being at least partially closed, such as a throttle angle of less than 45° in one example). The test conditions may further include an amount of EGR directed to the engine being above a threshold, such as above 10% EGR. Further still, the test conditions may include an elapsed time since a previous test being above a threshold time and/or a test mitigating event occurring. For example, the test may only be performed when a refill of the reducing agent solution tank is performed. In another example, the test may only be performed if a threshold amount of time has elapsed since a previous test (e.g., one week, 100 vehicle miles, etc.). Further, in some examples, the urea concentration test may not be performed if an exhaust leak is present. If an exhaust leak is present, a portion or an entirety of the reducing agent solution may be leaked to atmosphere or another location, and thus not all of the water in the reducing agent solution may be sensed by the oxygen sensor.

If the test conditions are not met, method 300 returns. If the test conditions are met, method 300 proceeds to 306 to measure a first water content of the exhaust with an oxygen sensor. As described above, the first water content of the exhaust may be the baseline water content of the exhaust (which may correspond to ambient humidity). In some examples, rather than measuring the baseline water content of the exhaust, it may be estimated based on output from other sensors (such as intake humidity or oxygen sensor).

At 308, a first amount of reducing agent solution (e.g., reductant) is injected to the exhaust system upstream of the SCR device. The first amount of reductant injected to the exhaust system may be based on a predicted urea (or ammonia, fuel, or other reducing agent) concentration of the reductant and the mass flow of the exhaust gas in the exhaust system, as indicated at 310. The predicted urea concentration may be based on a measured urea concentration from a previous test, or may be a concentration supplied by a manufacturer of the reductant. The injection of the first amount of reducing agent solution may provide a predicted or assumed overall urea concentration of the exhaust, and hence provide an assumed water content of the exhaust.

At 312, a second water content of the exhaust is measured with the oxygen sensor. The second water content reflects the water content of the injected reducing agent solution as well as the baseline water content of the exhaust gas. At 314, by subtracting the first water content from the second water content, a change in water content resulting from the reductant injection is determined. At 316, based on the change in water content, the urea (or other reductant) concentration of the reducing agent solution is determined. The urea concentration may be further based on exhaust temperature. For example, if exhaust temperature is relatively low (which may occur due to the lack of combustion in the engine), a portion of the reducing agent solution may remain as liquid. Liquid water may not displace the oxygen in the exhaust in the same manner as vaporized water, and thus may result in an water content determination that is lower than the actual water content. Thus, in some embodiments, the urea concentration may be corrected by the exhaust temperature. Further, in some examples, the oxygen concentration of the exhaust after the injection may be used to determine the urea concentration of the exhaust, based on a look-up table or graph (such as the graph of FIG. 2).

At 318, a second amount of reducing agent solution is injected to the exhaust. The second amount of reducing agent solution may be injected during a subsequent engine operating period when injection of reductant to the SCR device is indicated in order to convert NOx stored in the SCR device. The second amount of reducing agent solution may be based on the urea concentration determined at 316, as indicated at 320.

For example, if the urea concentration is above an upper limit threshold (such as greater than or equal to 5% larger than the predicted urea concentration), the amount of reducing agent solution injected may be decreased from an amount that would have been injected without measuring the urea concentration (e.g. based on the assumed or predicted urea concentration). On the other hand, if the urea concentration is below a lower limit threshold (such as less than or equal to 5% smaller than the predicted urea concentration), the amount of reducing agent solution injected may be increased. Because the urea concentration is inversely proportional to the water content of the exhaust, if the water content is above a threshold, the amount of reducing agent solution injected may be increased, while if the water content is below a threshold, the amount of reducing agent solution injected may be decreased.

The second amount of reducing agent solution may further be based on the mass flow of the exhaust and the NOx concentration of the exhaust, as indicated at 322, in order to maintain a designated amount of urea in the exhaust upstream or at the SCR device, such that the feed ratio for converting the NOx is maintained.

At 324, method 300 optionally includes performing a rationality check using the NOx sensor. The NOx sensor may be cross-sensitive to ammonia; that is, the NOx sensor may be configured to sense both NOx and ammonia levels (though it may not be able to differentiate NOx from ammonia). As such, because the urea concentration test is performed during conditions where NOx is not produced (e.g., no combustion is occurring), any output from the NOx sensor may assumed to be from the ammonia produced by the injected reducing agent. Thus, the amount of ammonia in the exhaust gas downstream of the reducing agent solution injection location may be determined based on output from the NOx sensor. If more or less ammonia is present than would be expected for the amount of reducing agent solution injected, it may be determined that the oxygen sensor or NOx sensor is degraded.

Thus, in one example, a method comprises adjusting an amount of reducing agent solution injected to an exhaust system based on a water content of exhaust gas in the exhaust system downstream of a reductant injection location in the presence of vaporized reducing agent.

The method may further comprise during select conditions, during select conditions, determining a water content of the exhaust gas following a reducing agent solution injection event and determining a water content of the reducing agent solution based on the water content of the exhaust gas; and correcting the water content of the reducing agent solution based on ambient humidity.

Adjusting the amount of reducing agent solution based on the water content of the exhaust gas may further comprise increasing the amount of reducing agent solution if the water content of the reducing agent solution is above an upper threshold and decreasing the amount of reducing agent solution if the water content of the reductant is below a lower threshold. The select conditions may comprise engine operation without fuel injection. The select conditions may further comprise one or more of an exhaust gas recirculation (EGR) amount greater than a threshold amount and an intake throttle angle less than a threshold angle.

The method may further comprise determining the water content of the exhaust gas based on output from an oxygen sensor in the exhaust system downstream of the reducing agent solution injection location. The amount of reducing agent solution injected to the exhaust system may be further adjusted based on a mass flow rate of exhaust gas in the exhaust system and a NOx concentration of the exhaust gas.

In another example, a method comprises injecting a first amount of reducing agent solution into an exhaust passage of an engine upstream of a selective catalyst reduction (SCR) device; determining a water content of the reducing agent solution based on output from an oxygen sensor positioned in the exhaust passage and determining a second, adjusted amount of reducing agent solution based on the water content of the reductant; and injecting the second amount of reducing agent solution into the exhaust passage upstream of the SCR device.

Determining the water content of the reducing agent solution may comprise, during engine operation without fuel injection: determining a first water content of exhaust gas in the exhaust passage prior to injecting the first amount of reducing agent solution; and determining a second water content of exhaust gas in the exhaust passage after injecting the first amount of reducing agent solution, wherein the water content of the reducing agent solution is a difference between the second water content of the exhaust gas and the first water content of the exhaust gas.

The first amount of reducing agent solution may be selected based on a predicted water content of the reducing agent solution and a mass flow rate of the exhaust gas, and further comprising adjusting the predicted water content of the reducing agent solution based on the determined water content of the reducing agent solution, the second amount of reducing agent solution selected based on the adjusted predicted water content of the reducing agent solution, the mass flow rate of the exhaust gas, and a NOx concentration of the exhaust gas.

The method may further comprise, prior to injecting the first amount of reducing agent solution, reducing a mass flow rate of exhaust gas in the exhaust passage by one or more of closing an intake throttle of the engine and increasing an amount of exhaust gas recirculated to the engine. The reducing agent solution may comprise a solution of water and urea.

The system and method provided above may provide for determining an actual urea concentration of a reducing agent solution injected into an exhaust system upstream of an SCR device, based on output from an oxygen sensor positioned in the exhaust system. During conditions where the engine is spinning and the vehicle is moving but fuel injection is deactivated, and in response to a request to learn the concentration of urea in a reducing agent solution, the reducing agent solution is injected into the exhaust system (e.g., into an exhaust passage) upstream of an SCR device and an oxygen sensor. The reducing agent solution is vaporized, by the heat of the exhaust and/or by a heating device, and the water content of the exhaust including the vaporized reducing agent solution is determined based on the output of the oxygen sensor. Because the vaporized water of the reducing agent solution displaces the exhaust gas, the oxygen concentration of the exhaust gas will decrease upon injection of the reducing agent solution. The oxygen concentration of the exhaust gas following the injection and vaporization may be predicted based on a presumed urea concentration (and hence presumed water concentration) of the reducing agent solution. That is, if the urea concentration is presumed to be 32.5%, the oxygen concentration may be predicted to be a given concentration based on the 32.5% urea concentration and based on the mass flow of the exhaust gas (which may be measured by a sensor in the exhaust system, or may be estimated based on intake air mass flow and/or throttle position). If the measured oxygen concentration deviates from the predicated oxygen concentration, the urea concentration may be different that the presumed urea concentration. For example, if the oxygen concentration is higher than expected, less water vapor is present to displace the exhaust gas, and thus the urea concentration is higher than the presumed concentration (e.g., is 35% rather than the presumed 32.5%). If the oxygen concentration is lower than expected, more water vapor is present to displace the exhaust gas, and thus the urea concentration is lower than the presumed concentration (e.g., is 30%). Then, during subsequent engine operation when injection of reducing agent is indicated to convert NOx in the SCR device (indicated based on output from the NOx sensor, for example), if the urea concentration is higher than presumed, less reducing agent may be injected, and if the urea concentration is lower than presumed, more reducing agent may be injected. Thus, a desired amount of urea may be present in the exhaust gas upstream or at the SCR device, regardless of the actual concentration of the urea in the reducing agent solution.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for monitoring a reducing agent solution composition in an exhaust gas system of an internal combustion engine with metered injection of the reducing agent solution upstream of an SCR catalytic converter, comprising:
    metering injection of the reducing agent solution into the exhaust gas stream;
    determining a change in water content in the exhaust gas stream in response to the injected reducing agent solution; and
    determining at least one indicator value of a composition of the reducing agent solution at least based on the change in water content.

2. The method as claimed in claim 1, wherein the change in water content is measured by a broadband oxygen sensor.

3. The method as claimed in claim 1, wherein in order to determine the change in water content, a baseline water content of the exhaust gas is determined without the reducing agent solution injection, based on one or more of other vehicle measured values, measured values from a dedicated moisture sensor arranged directly in the exhaust gas stream, or measurement by a sensor for measuring the change in water content without injection of injection agent, but under substantially identical measurement conditions.

4. The method as claimed in claim 1, wherein the at least one indicator value indicates a urea content in the reducing agent solution.

5. The method as claimed in claim 4, wherein as a function of the indicator value for the urea content:
    metering of the reducing agent solution is modified for subsequent operation of the SCR catalytic converter, and/or
    an operator of a motor vehicle comprising the exhaust gas system is provided with an error display if the indicator value exceeds or falls below a specified upper and/or lower threshold value.

6. The method as claimed in claim 1, wherein metering injection of the reducing agent solution into the exhaust gas stream further comprises:
    injecting the reducing agent solution such that a substantially constant reducing agent solution concentration is established in the exhaust gas stream over a measurement period, or injecting the reducing agent solution at a constant predetermined mass flow rate and correcting the measured value on the basis of an exhaust gas mass flow rate.

7. The method as claimed in claim 1, wherein
in order to increase measuring accuracy, a mass flow rate of the exhaust gas stream is reduced by constricting an inlet and/or by exhaust gas recirculation.

8. The method as claimed in claim 1, wherein the change in water content is determined downstream of the SCR catalytic converter.

9. A method, comprising:
adjusting an amount of reducing agent solution injected to an exhaust system based on a water content of exhaust gas in the exhaust system downstream of a reductant injection location in the presence of vaporized reducing agent.

10. The method of claim 9, further comprising:
during select conditions, determining a water content of the exhaust gas following a reducing agent solution injection event and determining a water content of the reducing agent solution based on the water content of the exhaust gas; and
correcting the water content of the reducing agent solution based on ambient humidity.

11. The method of claim 10, wherein adjusting the amount of reducing agent solution based on the water content of the exhaust gas further comprises increasing the amount of reducing agent solution if the water content of the reducing agent solution is above an upper threshold and decreasing the amount of reducing agent solution if the water content of the reducing agent solution is below a lower threshold.

12. The method of claim 10, wherein the select conditions comprise engine operation without fuel injection.

13. The method of claim 12, wherein the select conditions further comprise one or more of an exhaust gas recirculation (EGR) amount greater than a threshold amount and an intake throttle angle less than a threshold angle.

14. The method of claim 9, further comprising determining the water content of the exhaust gas based on output from an oxygen sensor in the exhaust system downstream of the reducing agent solution injection location.

15. The method of claim 9, wherein the amount of reducing agent solution injected to the exhaust system is further adjusted based on a mass flow rate of exhaust gas in the exhaust system and a NOx concentration of the exhaust gas.

16. A method, comprising:
injecting a first amount of reducing agent solution into an exhaust passage of an engine upstream of a selective catalyst reduction (SCR) device;
determining a water content of the reducing agent solution based on output from an oxygen sensor positioned in the exhaust passage and determining a second, adjusted amount of reducing agent solution based on the water content of the reductant; and
injecting the second amount of reducing agent solution into the exhaust passage upstream of the SCR device.

17. The method of claim 16, wherein determining the water content of the reducing agent solution comprises, during engine operation without fuel injection:
determining a first water content of exhaust gas in the exhaust passage prior to injecting the first amount of reducing agent solution; and
determining a second water content of exhaust gas in the exhaust passage after injecting the first amount of reducing agent solution, wherein
the water content of the reducing agent solution is a difference between the second water content of the exhaust gas and the first water content of the exhaust gas.

18. The method of claim 17, wherein the first amount of reducing agent solution is selected based on a predicted water content of the reducing agent solution and a mass flow rate of the exhaust gas, and further comprising adjusting the predicted water content of the reducing agent solution based on the determined water content of the reducing agent solution, the second amount of reducing agent solution selected based on the adjusted predicted water content of the reducing agent solution, the mass flow rate of the exhaust gas, and a NOx concentration of the exhaust gas.

19. The method of claim 16, further comprising, prior to injecting the first amount of reducing agent solution, reducing a mass flow rate of exhaust gas in the exhaust passage by one or more of closing an intake throttle of the engine and increasing an amount of exhaust gas recirculated to the engine.

20. The method of claim 16, wherein the reducing agent solution comprises a solution of water and urea.

\* \* \* \* \*